(12) United States Patent
Poxon et al.

(10) Patent No.: US 10,185,659 B2
(45) Date of Patent: Jan. 22, 2019

(54) MEMORY ALLOCATION SYSTEM FOR MULTI-TIER MEMORY

(71) Applicant: Cray, Inc., Seattle, WA (US)

(72) Inventors: Heidi Lynn Poxon, Hopkins, MN (US); William Homer, Eagan, MN (US); David W. Oehmke, Northfield, MN (US); Luiz DeRose, Rosemount, MN (US); Clayton D. Andreasen, Rosemount, MN (US); Sanyam Mehta, Minneapolis, MN (US)

(73) Assignee: Cray, Inc., Seattle, WA (US)

( * ) Notice: Subject to any disclaimer, the term of this patent is extended or adjusted under 35 U.S.C. 154(b) by 118 days.

(21) Appl. No.: 15/374,114

(22) Filed: Dec. 9, 2016

(65) Prior Publication Data

US 2018/0165209 A1    Jun. 14, 2018

(51) Int. Cl.
*G06F 12/02* (2006.01)
*G06F 12/08* (2016.01)
*G06F 8/41* (2018.01)

(52) U.S. Cl.
CPC ............ *G06F 12/0284* (2013.01); *G06F 8/41* (2013.01); *G06F 8/443* (2013.01); *G06F 12/08* (2013.01); *G06F 2201/885* (2013.01); *G06F 2212/1016* (2013.01); *G06F 2212/1021* (2013.01); *G06F 2212/601* (2013.01); *G06F 2212/604* (2013.01)

(58) Field of Classification Search
CPC .............. G06F 12/023; G06F 12/0871; G06F 2212/1021; G06F 2212/465; G06F 2212/604
See application file for complete search history.

(56) References Cited

U.S. PATENT DOCUMENTS

2009/0027416 A1*    1/2009   Barone ................. G06T 11/001 345/611

* cited by examiner

*Primary Examiner* — Yong J Choe
(74) *Attorney, Agent, or Firm* — Perkins Coie LLP

(57) ABSTRACT

A system is provided for allocating memory for data of a program for execution by a computer system with a multi-tier memory that includes LBM and HBM. The system accesses a data structure map that maps data structures of the program to the memory addresses within an address space of the program to which the data structures are initially allocated. The system executes the program to collect statistics relating to memory requests and memory bandwidth utilization of the program. The system determines an extent to which each data structure is used by a high memory utilization portion of the program based on the data structure map and the collected statistics. The system generates a memory allocation plan that favors allocating data structures in HBM based on the extent to which the data structures are used by a high memory utilization portion of the program.

31 Claims, 6 Drawing Sheets

MEMORY ALLOCATION SYSTEM FOR MULTI-TIER MEMORY

BACKGROUND

A current goal for designers of high-performance computing ("HPC") systems is to reach exascale computing, that is, exascale floating-point operations per second ("exaFLOPS"). To achieve exascale computing, designers envision an exascale computing system with many nodes, each of which has many cores. The use of many cores per node allows for increased performance through parallelization. Unfortunately, many application programs are constrained by limited memory bandwidth, even with many fewer cores in a node. As a result of the limited memory bandwidth, the memory read requests of the application programs are queued at the core, and the application programs stall while waiting for the queued read requests to be processed.

High-bandwidth memory ("HBM") has the potential of allowing such application programs to execute without incurring significant delays due to stalling while waiting for queued memory read requests. HBM currently provides up to five times the memory bandwidth of low-bandwidth memory ("LBM"), such as double data rate fourth generation ("DDR4") memory. HBM achieves the higher bandwidth while using less power in a substantially smaller form factor than other memory techniques. The higher bandwidth may be achieved by stacking up to eight dynamic random access memories ("DRAM") dies, which may include a base die with a memory controller. The memory bus of an HBM memory is very wide in comparison to other DRAM. An HBM stack of four DRAM dies may have two 128-bit channels per die for a total of eight channels and a total width of 1024 bits. Examples of HBM include the High-Bandwidth Memory provided by Advanced Micro Devices, Inc., the Hybrid Memory Cube provided by Micron Technology, Inc., and the Multi-Channel DRAM provided by Intel Corp.

For cost reasons, some computer architectures provide a large amount of LBM and a much smaller amount of HBM. The computer architectures may support different memory modes: cache mode, flat mode, and hybrid mode. With cache mode, the HBM operates as a cache memory. With flat mode, the physical address space of memory includes both LBM and HBM. With hybrid mode, a portion of the HBM operates as cache memory, and the remainder of the HBM is part of the physical address space of memory along with the LBM.

When the physical address space of memory includes HBM (i.e., the flat mode and the hybrid mode), the allocation of the data structures of a program between HBM and LBM can influence the execution performance of the program. As an example, a program may have a first data structure with an access pattern such that each element of the first data structure is written only once and never read, and a second data structure (of the same size) with an access pattern such that each element is read many times. In such a case, the performance of the program would likely suffer if the first data structure was allocated in HBM and the second data structure was allocated in LBM. Performance of the program may be improved significantly by storing as much of the second data structure as possible in the HBM. In general, the data structures that consume the most off-chip bandwidth (e.g., memory requests sent from the processor to memory per time interval) are likely candidates for allocation in HBM. Unfortunately, the identification of such candidates can be very difficult, even for an expert programmer. The difficulty arises, in part, because the identification has significant dependencies on both compiler optimizations and implementation of the host hardware. For example, compiler optimizations such as automatic vectorization, and hardware features such as out-of-order execution and prefetching, can significantly alter the memory access pattern of a target loop or region of a program that accesses a data structure.

DETAILED DESCRIPTION

Figure 1:
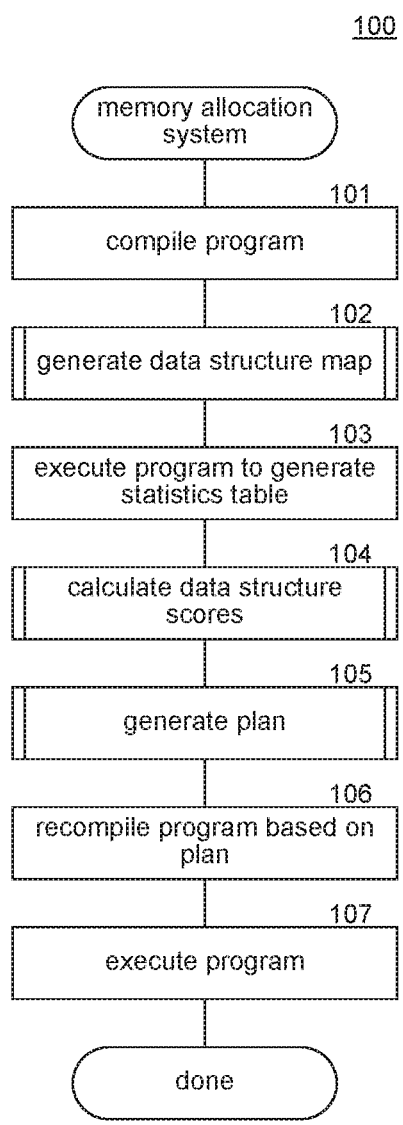
FIG. 1 is a flow diagram that illustrates the overall processing of a memory allocation system in some embodiments.

A method and a system are provided for allocating memory for data of a program for execution by a computer system with a multi-tier memory that includes a least a low-bandwidth memory and a high bandwidth memory with a bandwidth that is higher than the low-bandwidth memory. The multi-tier memory may also have three or more memories of differing bandwidths that range from a lowest bandwidth to a highest bandwidth. In some embodiments, a memory allocation system collects statistics relating to memory requests and memory bandwidth utilization of the program during execution of the program with a primary goal of collecting the statistics. The program may be instrumented to collect the statistics, or a separate program (e.g., in a privileged mode) may execute in parallel to collect the statistics. When instrumented, the program may be modified to cause an interrupt on every occurrence of a certain event and to collect the statistics during each interrupt. The statistics relating to the memory requests may be, for example, the number of off-chip memory requests as indicated by the number of last level cache ("LLC") misses. The statistics relating to the memory bandwidth utilization may be, for example, number of stalled cycles and the inverse of the instruction rate (e.g., instructions per second). The number of stalled cycles increases as the processor stalls waiting for memory requests (e.g., to HBM or LBM). So, a region of the program with a high number of memory requests and a memory bandwidth utilization is a region (e.g., loop) whose performance is adversely affected because the program stalls waiting on memory requests. Such a region of the program is referred to as a high memory utilization region or portion. The data structures whose elements are loaded by a high memory utilization region can be considered candidates for allocation in HBM. The memory allocation system may collect the statistics during an execution of the program in which all the data structures are stored in LBM so that the statistics are not affected by a data structure that just happens to be allocated in HBM.

In some embodiments, after the statistics are collected, a programmer may add compiler directives to the program or modify the program to cause certain data structures to be allocated in HBM based on review of the statistics. Based on the collected statistics, the memory allocation system may also generate a memory allocation plan that favors allocating data structures accessed by high memory utilization regions in HBM. A programmer may then add compiler directives or modify the program to implement the memory allocation plan. Alternatively, a compiler may be adapted to input the memory allocation plan directly and to allocate the data structures of the program as per the plan. In this way, the allocation of data structures between HBM and LBM for an execution of the program is based on actual performance statistics collected during a prior execution of the program. In some embodiments, the statistics collected during an execution of the program may be used to dynamically change the allocation of data structures between HBM and LBM during the same execution of the program. For example, a program may receive a continuous stream of input data whose characteristics change over time. If the characteristics of the input data changes over time, the most appropriate allocation of data structures between HBM and LBM may also change. As a result, the memory allocation system may be employed to generate a new memory allocation plan based on the changing characteristics.

In some embodiments, the memory allocation system may use the statistics that are collected for the occurrences of the event as a sampling of the overall performance of the program. Upon an occurrence of the event, the memory allocation system may, in addition to collecting the statistics, identify the load instruction that caused a most recent LLC miss. The memory allocation system may determine the instruction address where the load instruction is stored and the data address where the data is to be loaded by the load instruction. The memory allocation system may use the instruction address and the data address to identify the data structure of the program that is the target of the load instruction. To identify the target data structure, the memory allocation system may access a data structure map that maps data structures of the program to the memory addresses within an address space of the program to which the data structures are allocated. The memory allocation system may generate the data structure map based on information (e.g., a symbol table) output by the compiler that compiled the program. The memory allocation system may identify the data structures during execution of the program or after execution of the program. To improve the accuracy of the sampling, the memory allocation system may increase the sampling rate (e.g., reduce the number of LLC misses that cause an interrupt number of hits or misses of a hardware cache or buffer). If the sampling rate is increased, the execution time of the program will increase during the collection of the statistics. The memory allocation system may use various techniques to specify the number of LLC misses that cause the next occurrence of the event. For example, the memory allocation system may randomly select the number of LLC misses that is in a range from a minimum to a maximum number. For some programs, such an approach may result in a more accurate representation of the data structures accessed by high memory utilization regions of the program.

In some embodiments, the memory allocation system may employ various types of the performance counters as statistics that represent memory requests and memory bandwidth utilization. These statistics may include expiration of a timer, number of instructions executed, number of execution cycles, number of stalled cycles, LLC misses or hits, and so on. The number of stalled cycles may be approximated based on accesses (hits or misses) to a line fill buffer or an outstanding request buffer.

In some embodiments, the memory allocation system may generate a score for each data structure based on being loaded by high memory utilization regions of the program. A higher score may indicate that the data structure is more likely a candidate to be stored in HBM. In some embodiments, the memory allocation system generates an overall score for a data structure by summing the scores attributed to that data structure upon each occurrence of an event in which the last load instruction is loaded from that data structure. The score for each occurrence may be the product of the number of memory requests and the memory bandwidth utilization since the last occurrence of the event. The memory allocation system may estimate the number of memory requests in various ways such as the number of LLC misses since the last occurrence or the sum of the number of LLC misses and the number of LLC hits since the last occurrence. The number of LLC misses may be an accurate estimate of the number of memory requests when there is no hardware or software prefetching from memory or when the number of LLC misses includes misses due to prefetching. The sum of the LLC misses and LLC hits may be useful when hardware or software prefetching results in LLC hits that would otherwise result in an LLC miss. The memory bandwidth utilization may be estimated based on the time since the last occurrence, the number of instructions executed since the last occurrence and the time since the last occurrence, the number of processor cycles since the last occurrence, the number of processor stalled cycles since the last occurrence, the number of instructions executed since the last occurrence, and so on.

In some embodiments, the memory allocation system may instrument the program to further specify that the statistics relate to different phases of a program. The phases of a program may have very different access patterns to the data structures of the program, and thus it may be beneficial to allocate different data structures to HBM during different phases. For example, a simulation system may employ a data gathering phase, a pre-processing phase, a simulation phase, and a data analysis phase. The pre-processing phase may load (or read) data from a first data structure and only store (or write) data in a second data structure. The simulation phase, in contrast, may not access the first data structure, but repeatedly load data from the second data structure. In such a case, it may be beneficial to have the first data structure in HBM during the pre-processing phase and the second data structure in HBM during the simulation phase. The memory allocation plan for the simulation system may specify to store the first data structure in HBM and the second data structure in LBM during the pre-processing phase. The memory allocation plan may also specify to move the second data structure to HBM and possibly move the first data structure to the LBM for the simulation phase. In such a case, the memory allocation system may generate a separate memory allocation plan for each phase that factors in the overhead of moving the data structures to and from HBM.

In some embodiments, the memory allocation system may use various techniques for selecting the data structures that are to be allocated in HBM. For example, the memory allocation system may allocate the data structures to HBM in score order until the HBM is full. As another example, the memory allocation system may, independently of any phases, allocate different data structures to HBM based on access patterns to the data structures during the lifetime of the program. The memory allocation system may ensure that only complete data structures are allocated in HBM or may allow a portion of a data structure to be allocated to HBM and the rest to LBM. Various optimization techniques may be used when factoring the overhead of moving the data structures to identify the memory allocation plan that will result in the best performance. In some embodiments, the memory allocation system may generate multiple memory allocation plans for a program. The memory allocation system can then execute the program based on each memory allocation plan to identify the best performing memory allocation plan.

FIG. 1 is a flow diagram that illustrates the overall processing of a memory allocation system in some embodiments. The memory allocation system 100 generates a memory allocation plan for a program so that the program can be executed in accordance with the memory allocation plan. In block 101, the memory allocation system compiles the program, which may output information (e.g., a symbol table) indicating the allocation of the data structures within the address space of the program. In block 102, the memory allocation system invokes a component to generate a data structure map that maps each data structure to its address range in the address space of the program. In block 103, the memory allocation system directs the execution of the program to generate a statistics table that contains the statistics collected by the memory allocation system. In block 104, the memory allocation system invokes a calculate data structure scores component to calculate a score for each data structure of the program. In block 105, the memory allocation system invokes a generate plan component to generate a memory allocation plan for the program. In block 106, the memory allocation system directs the program to be recompiled based on the generated memory allocation plan. In block 107, the memory allocation system directs the execution of the program based on the memory allocation plan. The memory allocation system then completes.

Figure 2:
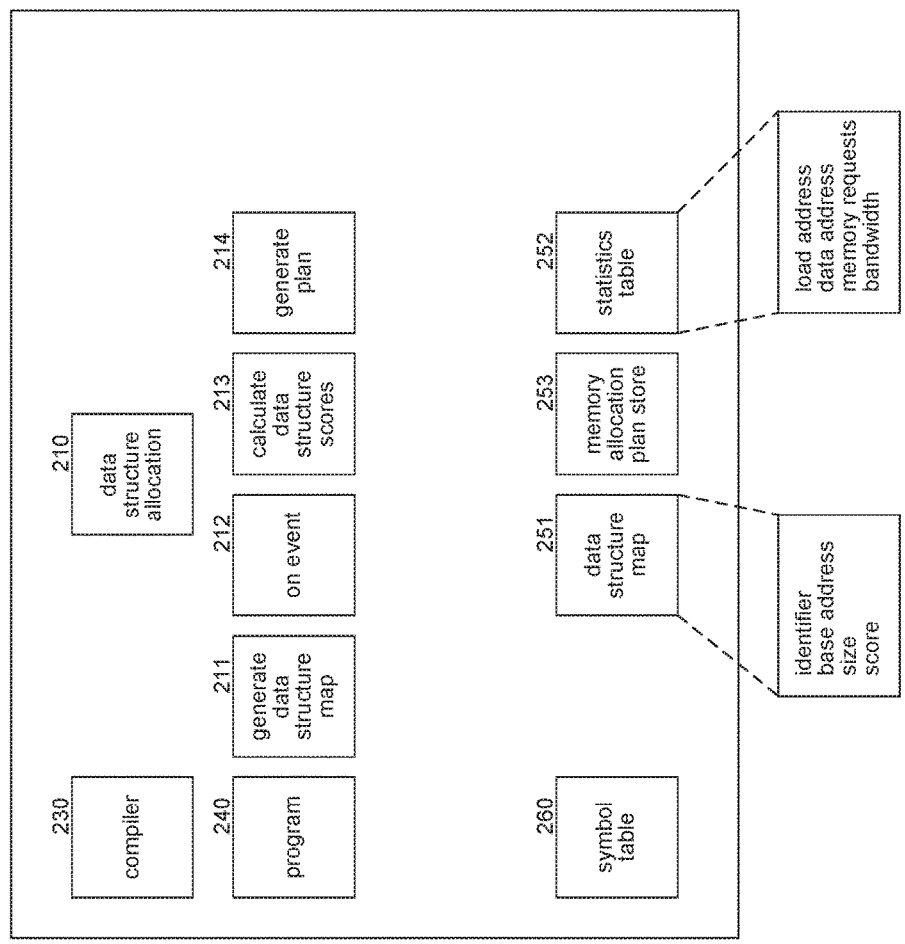
FIG. 2 is a block diagram that illustrates components and data used by the memory allocation system in some embodiments.

FIG. 2 is a block diagram that illustrates components and data used by the memory allocation system in some embodiments. The components include a data structure allocation component 210 that invokes a generate data structure map component 211, an on event component 212, a calculate data structure scores component 213, and a generate plan component 214. Each of components 211-214 is described in detail with reference to a corresponding figure. The components also include a compiler 230 that compiles a program 240. The compiler may also generate a symbol table 260 that includes information describing the layout of the data structures of the program. The data used by the memory allocation system include a data structure map 251, a statistics table 252, and a memory allocation plan store 253. The data structure map may be generated from the symbol table and may contain an entry for each data structure that includes an identifier of the data structure, the base address of the data structure, and the size of the data structure. The identifier of the data structure may include the name of the data structure and location (e.g., line number) in the program of the declaration for (or allocation of) the data structure. The data structure map may also include a score for the data structure that is generated by the calculate data structure scores component. The statistics table contains a statistics record for each occurrence of the event. The on event component creates the statistics records and stores them in the statistics table. Each record includes the load address and the data address of a load instruction, a memory request statistic, and memory bandwidth utilization statistic. The memory allocation plan store stores the memory allocation plan created by the generate plan component. The memory allocation plan may indicate for each data structure to be stored in HBM along with the start address of the data structure. The memory allocation plan may also indicate when data structures are to be moved from LBM to HBM and vice versa.

The computing systems used by the memory allocation system may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the memory allocation system. The data transmission media are used for transmitting data via transitory, propagating signals or carrier waves (e.g., electromagnetism) via a wired or wireless connection.

The memory allocation system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the memory allocation system may be implemented in hardware using, for example, an application-specific integrated circuit (ASIC).

Figure 3:
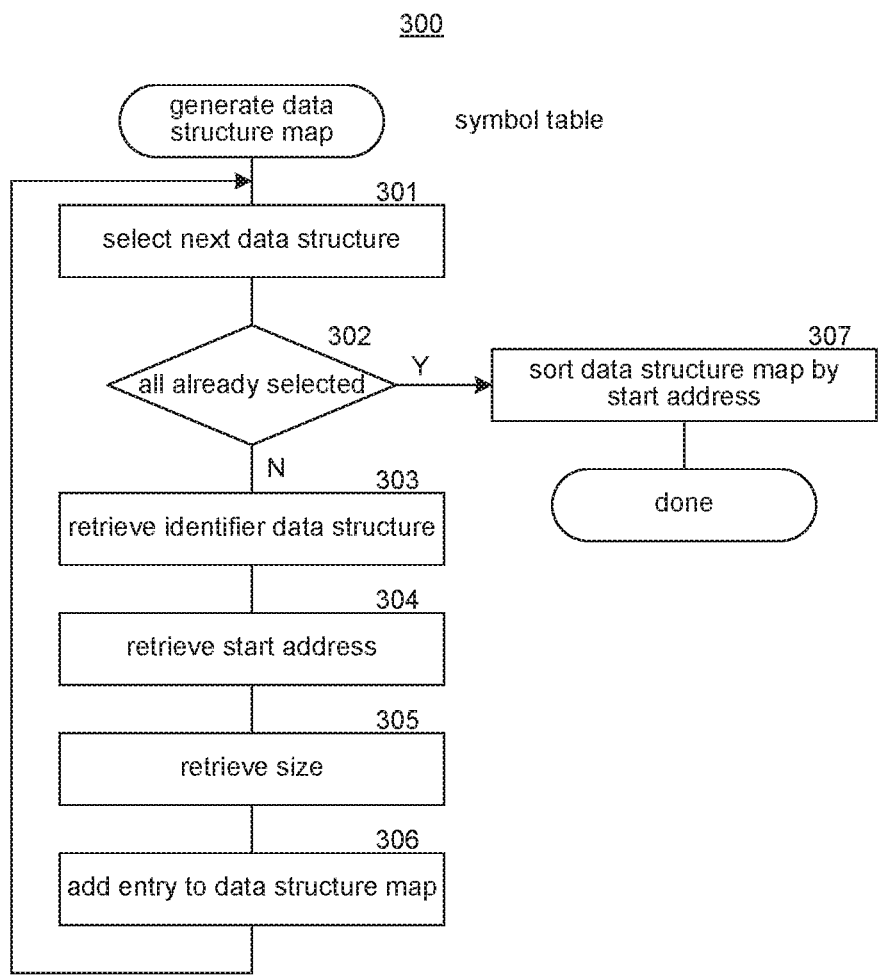
FIG. 3 is a flow diagram that illustrates the processing of a generate data structure map component of the memory allocation system in some embodiments.

FIG. 3 is a flow diagram that illustrates the processing of a generate data structure map component of the memory allocation system in some embodiments. The generate data structure map component 300 is invoked to generate a data structure map that identifies the start addresses and sizes of the data structures of the program in the address space of the program. The component may be passed an indication of the symbol table generated by the compiler. The component may be invoked multiple times during execution of the program such as at the beginning to process global data structures and upon entry to each function that declares or allocates data structures (e.g., objects). In block 301, the component selects the next data structure. In decision block 302, if all the data structures have already been selected, then the component continues at block 307, else the component continues at block 303. In block 303, the component retrieves the identifier of the selected data structure from the symbol table. In block 304, the component retrieves the start address of the selected data structure from the symbol table. In block 305, the component retrieves the size of the selected data structure from the symbol table. In block 306, the component adds an entry to the data structure map for the selected data structure and then loops to block 301 to select the next data structure. In block 307, the component sorts the data structure map based on start address to facilitate the identifying of the data structure that contains a load address. The component then completes.

Figure 4:
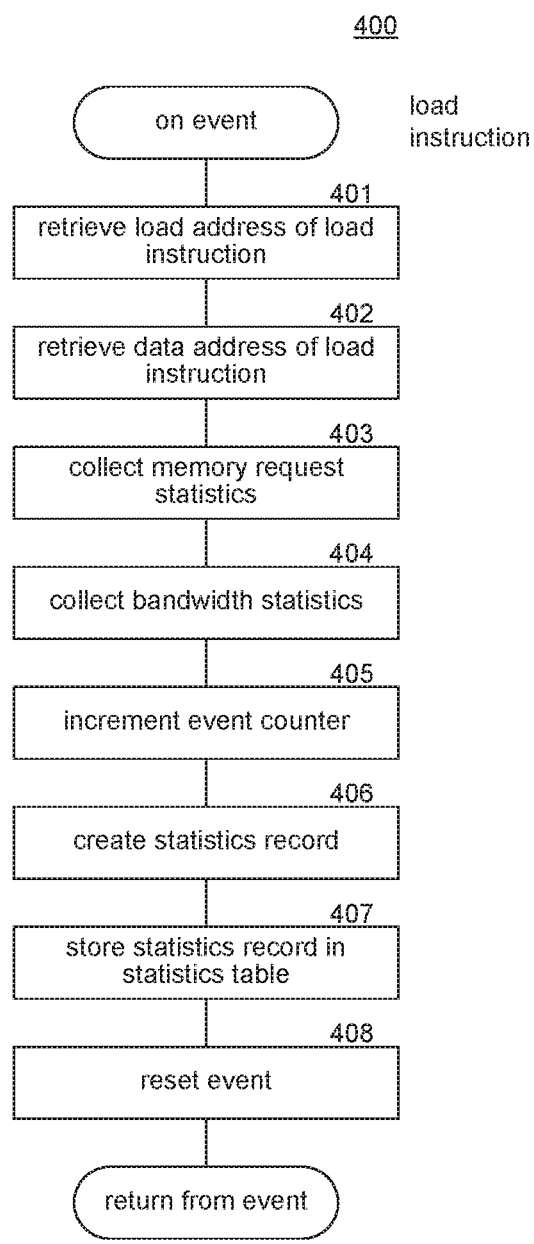
FIG. 4 is a flow diagram that illustrates the processing of an on event component of the memory allocation system in some embodiments.

FIG. 4 is a flow diagram that illustrates the processing of an on event component of the memory allocation system in some embodiments. The on event component 400 is invoked on the occurrence of an event and is passed an indication of a load instruction. The component creates a statistics record for the event and stores the statistic record in the statistics table. In block 401, the component retrieves the load address of the load instruction that was last executed. In block 402, the component retrieves the data address (e.g., virtual address) of the load instruction that was last executed. The component may also map the virtual addresses to physical addresses. In block 403, the component collects the memory request statistics. In block 404, the component collects the memory bandwidth utilization statistics. In block 405, the component increments an event counter that indexes the next record in the statistics table. In block 406, the component creates a statistics record with the retrieved load address and data address, and the collected memory request statistics and bandwidth statistics. In block 407, the component stores the statistics record in the statistics table. In block 408, the component resets the event, for example, by resetting a performance counter that counts down from a certain count. The component then returns from the event.

Figure 5:
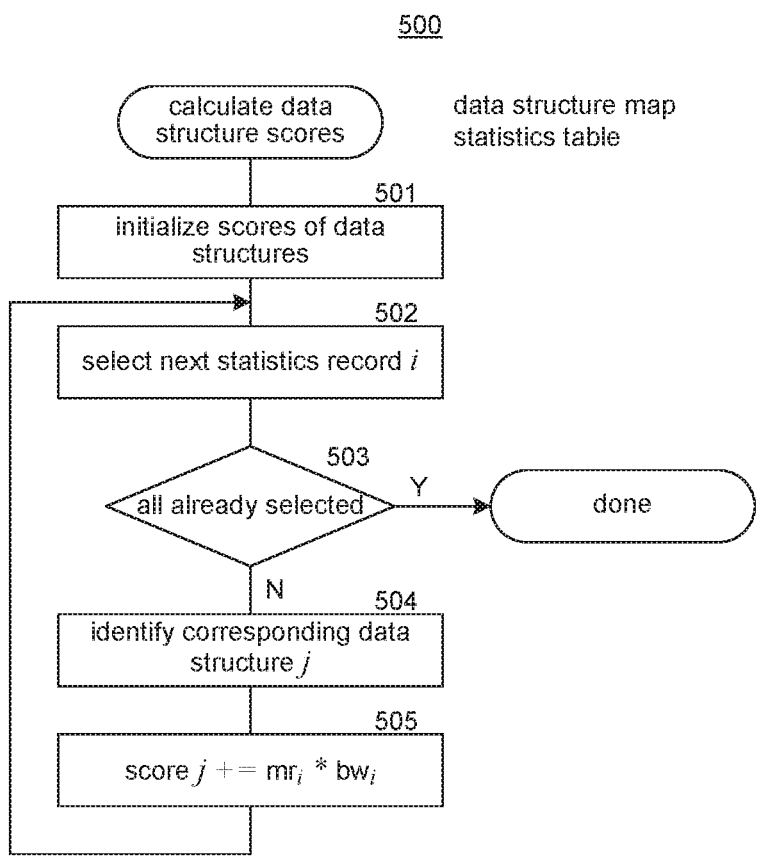
FIG. 5 is a flow diagram that illustrates the processing of a calculate data structure scores component of the memory allocation system in some embodiments.

FIG. 5 is a flow diagram that illustrates the processing of a calculate data structure scores component of the memory allocation system in some embodiments. The calculate data structure scores component 500 is passed an indication of the data structure map and the statistics table, and calculates a score for each data structure of the data structure map. In block 501, the component initializes the scores of the data structures to zero. In block 502, the component selects the next statistics record of the statistics table. In decision block 503, if all the statistics records have already been selected, then the component completes, else the component continues at block 504. In block 504, the component identifies the data structure that contains the data address of the selected statistics record. In block 505, the component generates a score for the identified data structure that is a product of the memory request statistic to the memory bandwidth utilization statistic for the selected statistics record. The component then loops to block 502 to select the next statistics record.

Figure 6:
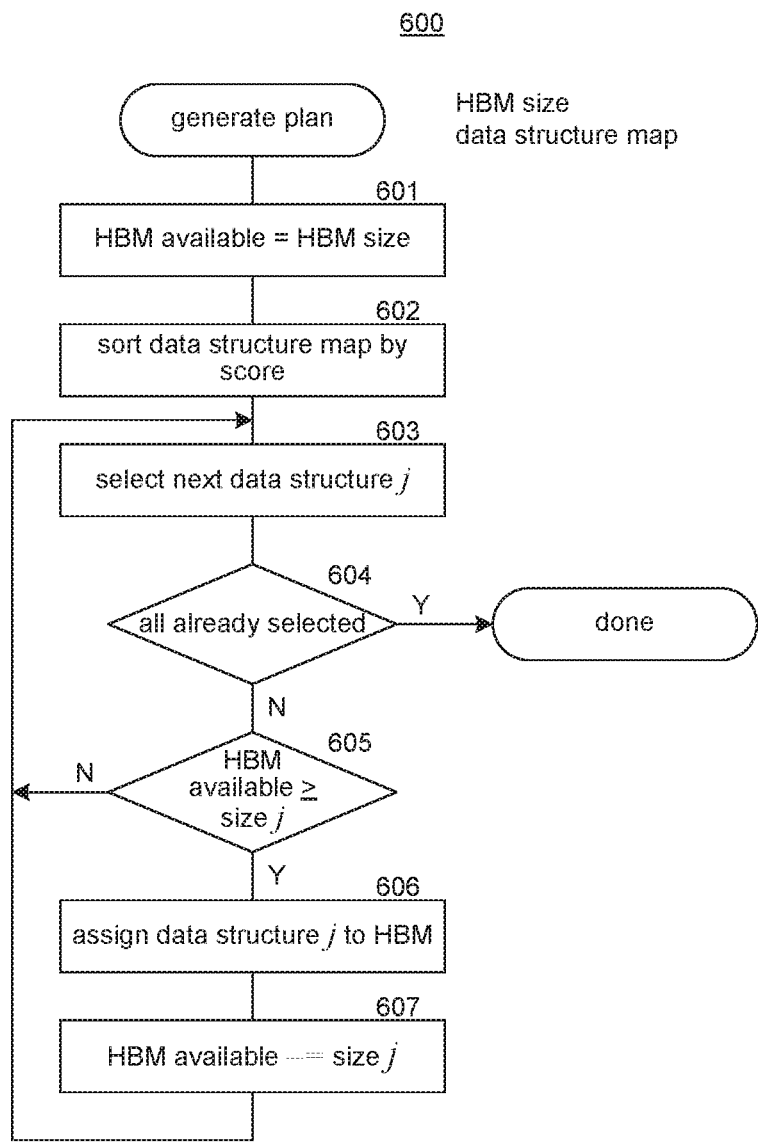
FIG. 6 is a flow diagram that illustrates the processing of a generate plan component of the memory allocation system in some embodiments.

FIG. 6 is a flow diagram that illustrates the processing of a generate plan component of the memory allocation system in some embodiments. The generate plan component 600 is invoked and is passed an indication of the size of the HBM and the data structure map. In block 601, the component initializes the amount of HBM that is available to the size of the HBM memory. In block 602, the component sorts the data structure map by the scores. In block 603, the component selects the next data structure. In decision block 604, if all the data structures have already been selected, then the component completes, else the component continues at block 605. In decision block 605, if the amount of HBM that is available is greater than the size of the selected data structure (assuming only complete data structures are allocated in HBM), then the component continues at block 606, else the component loops to block 603 to select the next data structure. In block 606, the component assigns the data structure to HBM. In block 607, the component decrements the HBM that is available by the size of the selected data structure and loops to block 603 to select the next data structure.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for allocating memory for data of a program for execution by a computer system with a multi-tier memory that includes a low-bandwidth memory and a high-bandwidth memory, the method comprising:
   accessing a data structure map that maps data structures of the program to the memory addresses within an address space of the program to which the data structures are initially allocated;
   executing the program to collect statistics relating to memory requests and memory bandwidth utilization of the program;
   for each of a plurality of data structures, determining an extent to which the data structure is used by a high memory utilization portion of the program based on the data structure map and the collected statistics; and
   generating a memory allocation plan that favors allocating data structures in high-bandwidth memory based on the extent to which the data structures are used by a high memory utilization portion of the program.

2. The method of claim 1 further comprising generating the data structure map based on information generated during compilation and execution of the program.

3. The method of claim 1 further comprising compiling the program based on the memory allocation plan.

4. The method of claim 3 wherein the compiling accesses compiler directives implementing the memory allocation plan.

5. The method of claim 3 wherein source code of the program is modified to implement the memory allocation plan.

6. The method of claim 1 wherein during execution of the program, the statistics are collected based on the-occurrences of events.

7. The method of claim 6 wherein at least one of the events occurs when a threshold level of a performance counter is reached.

8. The method of claim 7 wherein the performance counter is the number of last level cache misses since a last occurrence of the event.

9. The method of claim 7 wherein the performance counter is the number of hits or misses in a hardware cache or buffer since a last occurrence of the event.

10. The method of claim 6 wherein the event occurs at time intervals.

11. The method of claim 6 wherein the determining of the extent includes generating a score for each of the plurality of data structures, wherein the statistics collected upon an occurrence of the event include a data address of a data structure to be loaded by a load instruction associated with the occurrence of the event, and wherein a score for the occurrence of the event is generated based on the number of memory requests of the program and the memory bandwidth utilization of the program since a last occurrence of the event.

12. The method of claim 11 wherein the score for a data structure is based on a sum of the scores for the occurrences of the event whose data address is within the data structure.

13. The method of claim 1 wherein the determining of the extent includes generating a score for each of the plurality of data structures wherein the score is based on a product of the number of memory requests to the memory bandwidth utilization.

14. The method of claim 1 wherein the memory requests are estimated based on the number of last level cache misses.

15. The method of claim 1 wherein the memory requests are estimated based on the number of last level cache misses and last level cache hits.

16. The method of claim 1 wherein the memory bandwidth utilization is estimated based on the number of instructions executed during the time interval between collections of the statistics to the time interval.

17. The method of claim 1 wherein the memory bandwidth utilization is estimated based on a time interval between collections of the statistics.

18. The method of claim 1 wherein the memory bandwidth utilization is estimated based on a combination of the number of instructions executed and the number of processor cycles between collections of the statistics.

19. The method of claim 1 wherein the memory bandwidth utilization is estimated based on the number of processor-stalled cycles between collections of the statistics.

20. The method of claim 1 wherein the generating of the memory allocation plan includes generating a different memory allocation plan for different phases of execution of the program.

21. The method of claim 1 wherein the generating of the memory allocation plan includes applying an optimization algorithm to minimize the number of load instructions that when executed result in a load from the low-bandwidth memory to a cache.

22. The method of claim 1 wherein the memory allocation plan specifies to copy a first data structure from low-bandwidth memory to high-bandwidth memory during execution of the program.

23. The method of claim 22 wherein the memory allocation plan specifies to copy a second data structure from high-bandwidth memory to low-bandwidth memory during execution of the program to make room for the first data structure in the high-bandwidth memory.

24. A computer system for allocating data structures of a program for execution by a target computer system with a multi-tier memory that includes a low-bandwidth memory and a high-bandwidth memory, the computer system comprising:

a computer-readable storage medium storing computer-executable instructions for controlling the computer system to:
 access a data structure map that maps data structures of the program to the memory address within an address space of the program to which the data structures are initially allocated;
 access statistics relating to memory requests and memory bandwidth utilization of the program that were collected during execution of the program; and
 for each of a plurality of data structures, determine an extent to which the data structure is used by a high memory utilization portion of the program based on the data structure map and the collected statistics; and
a processor for executing the computer-executable instructions stored in the computer-readable storage medium.

25. The computer system of claim 24 wherein the computer-executable instructions further control the computer system to generate a memory allocation plan that favors allocating data structures in high-bandwidth memory based on the extent to which the data structures are used by a high memory utilization portion of the program.

26. The computer system of claim 24 wherein the statistics were collected upon occurrences of an event during execution of the program.

27. The computer system of claim 26 wherein the event is based on the number of last level cache misses.

28. The computer system of claim 26 wherein the event is based on the number of last level cache hits.

29. The computer system of claim 26 wherein the event is based on a time interval.

30. The computer system of claim 24 wherein the statistics include different sets of statistics for different phases of execution of the program.

31. The computer system of claim 30 wherein the computer-executable instructions further control the computer system to, for each phase of execution, generate a memory allocation plan that favors allocating data structures in high-bandwidth memory based on the extent to which the data structures are used by a high memory utilization portion of the program.

* * * * *